Jan. 17, 1939.　　　　K. MAYBACH　　　　2,144,074
AUTOMATIC CLUTCH CONTROL DEVICE
Filed March 10, 1936
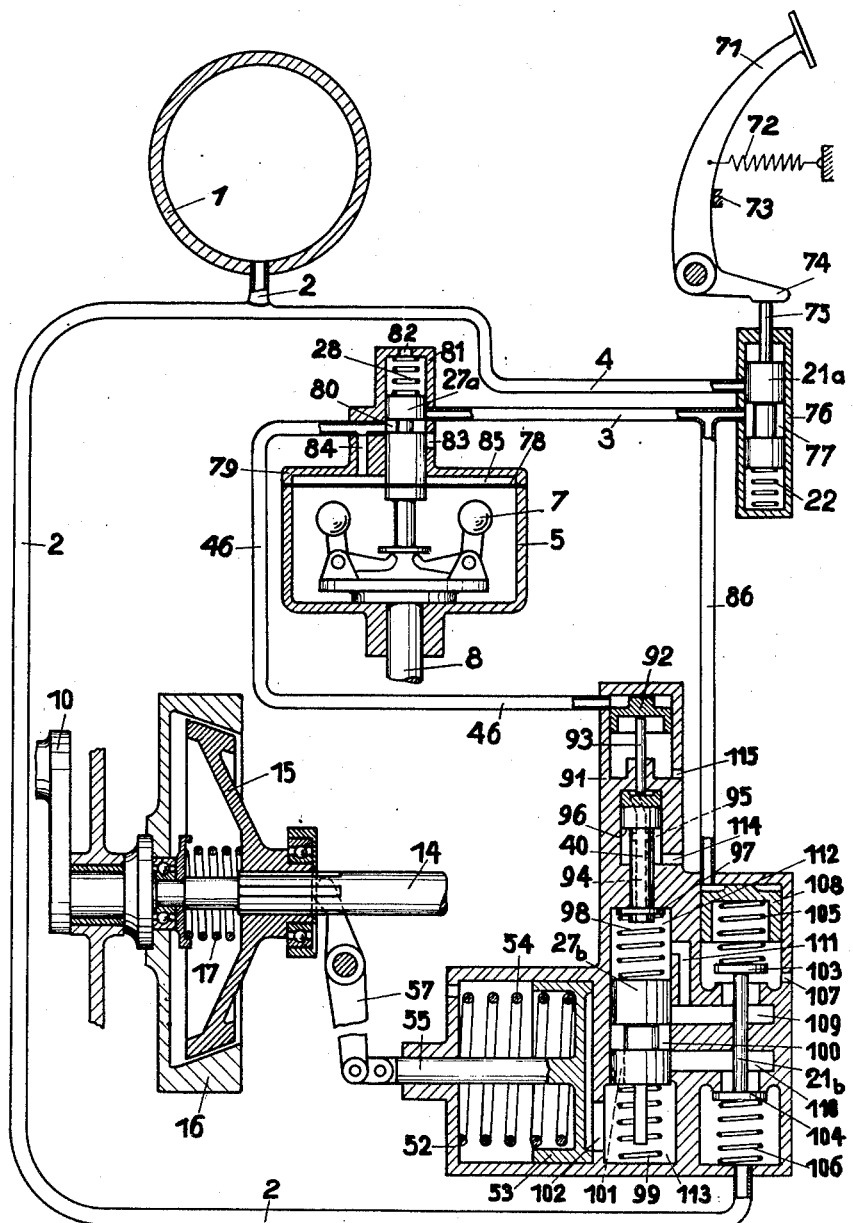
Inventor: Karl Maybach
By Watson, Coit, Morse & Grindle
Attorneys Patented Jan. 17, 1939

2,144,074

UNITED STATES PATENT OFFICE 2,144,074

AUTOMATIC CLUTCH CONTROL DEVICE

Karl Maybach, Friedrichshafen-on-the-Bodensee, Germany, assignor to Maybach-Motorenbau, Gesellschaft mit beschrankter Haftung, Friedrichshafen-on-the-Bodensee, Germany, a corporation of Germany Application March 10, 1936, Serial No. 68,101
In Germany March 27, 1935

13 Claims. (Cl. 192—.01)

Specification Serial No. 689,062 discloses a device for the disengaging and engaging of clutches, more particularly those mounted between the engine and wheel-driving gear in motor vehicles, whereby smooth starting and acceleration is guaranteed under all conditions, independently of the resistances which are offered at the time to the movement of the vehicle. By means of an indirect acting control, automatic disengagement of the clutch is effected in known manner at a low engine speed, and upon this speed being exceeded, the clutch is first applied without power transmission or with only a slight pressure of application, and then the clutch-engaging force is controlled automatically by an auxiliary device, dependent upon the engine speed, in accordance with the engine speed which appears during the clutch-engaging operation, due to the resistances to travel and to the regulation of the engine by the driver. The movement of the slidable clutch member adjusts itself automatically, in each stage of the clutch-engaging operation, to the resistances to travel and to the regulation effected by the driver. Fluid under pressure, compressed gas, vacuum or electric current is provided as working medium for the auxiliary device.

The device includes a control member, the commencement and termination of the operation of which, corresponding to the transition between engagement and disengagement of the clutch, depends in known manner upon the speed of the driving engine. By means of an additional auxiliary device, the clutch-engaging force is regulated in dependence upon the speed of the driving engine, and by means of a change-over device, likewise dependent upon the speed of the driving engine, the working medium pressure employed for disengagement or the working medium pressure regulating the clutch-engaging force dependent upon the engine speed is supplied alternately to the auxiliary power device actuating the clutch members.

For the same purpose of a perfectly smooth progression of the clutch-engaging operation, provision is made in the constructional example given in the specification referred to for the final complete engagement of the clutch to be effected by applying the clutch members with the maximum pressure of the working medium of the auxiliary power device upon the attainment of synchronism or approximate synchronism of the parts to be coupled, this being accomplished by a control member dependent upon a synchronizing device being inserted between the change-over device and the auxiliary power device actuating the clutch members.

Practical travelling tests have shown that the regulation of the clutch-engaging force in accordance with the engine speed is of principal importance for smooth engagement of the clutch, while the final engagement of the clutch with the maximum application pressure need not absolutely take place when the clutch members are in synchronism, but rather that it is only necessary to have attained a certain minimum application pressure and hence a certain minimum engine speed which, according to the regulation of the engine by the driver may be substantially equal to the synchronism speed, or higher or lower than the synchronism speed, in order to ensure smooth engagement in all practical cases on passing to the maximum clutch pressure. This changing over from the regulated clutch-engaging force to full application pressure at a certain engine speed recognized to be correct can be accomplished by means of a simplified control of the working medium, the comparatively expensive synchronizing device being omitted.

A further simplification of a kind known per se is secured by making the control member, which effects the disengagement at a low speed, indirectly and not directly dependent upon the engine speed, the said control member being connected to the accelerator. Since the device according to the invention serves more particularly for the purposes of starting and for motor vehicles having a free-wheel action, the minimum idling speed appears at once after releasing the accelerator, on account of the separation of the engine from the vehicle driving gear, and therefore the device according to the invention can be further simplified and cheapened by connecting the said control member to the accelerator, instead of its being directly dependent upon the engine speed.

The various parts of the device according to the invention, in the further development thereof, are still more considerably simplified and cheapened and are so designed as to provide in all cases a more reliable and rapid co-operation, and hence an absolutely automatic termination of the engagement operation, which while being smooth is as rapid as possible, such as has not been possible in any of the devices known heretofore. In particular, the arrangement and combination of the various parts of the device have also been designed with a view to attaining the least possible losses of pressure medium. The details will follow from the description given hereinafter. The construction and arrangement described is extremely advantageous and is also of considerable importance for the device according to specification Serial No. 689,062.

The connections of the various control members with each other have also been considerably simplified. More particularly, the change-over device is substantially simpler, due to the special arrangement, movement and connection of its control member, the said control member for example in one of its end positions and in intermediate positions causing the working medium pressure corresponding to the disengaged clutch, and in its other end position the regulated pressure of the working medium, to act upon the control member of the auxiliary power device for the clutch, which control member supplies the working medium directly to the auxiliary power device for the clutch.

Furthermore, the device according to the invention is improved by supplying to the control member of the additional auxiliary device regulating the clutch-engaging force in accordance with the engine speed, the working medium controlled by the control member, the commencement and termination of the operation of which depend upon the engine speed, and which brings about the disengagement of the clutch. This arrangement affords the advantage that the speed-dependent auxiliary device, when the clutch is disengaged does not consume pressure medium and does not suffer from any pressure losses whatsoever on account of leakages. This is all the more important, since in such cases the engine is running at a low speed, and therefore the pressure medium accumulator is re-charged only a little or not at all, so that there would be a risk of the supply of pressure medium failing.

A constructional example of a device embodying the improvements according to the invention is shown diagrammatically in section in the accompanying drawing. In this drawing, the principal parts, especially the control members, are provided with the same reference numerals as are employed for these parts in the earlier specification referred to. Compressed air is used as the working medium.

Referring to the drawing, 1 is a compressed air container, 2 is a compressed air conduit, 3 and 4 are connecting conduits, 5 is the casing of a centrifugal governor 7 driven off the vehicle engine by the shaft 8. 10 is the crank shaft of the driving engine, 14 the driven shaft, 16 the flywheel, 15 the slidable part of the clutch, and 17 the engagement spring of the clutch. At 21a is shown a control member which is under the action of the spring 22, and 21b is a stop valve. At 27a is shown a control member which is actuated by the centrifugal governor 7 and is also acted upon by the spring 28. At 27b is a further control member, 40 is a change-over member and 46 is a connecting conduit. 52 is the cylinder of the clutch-operating device, and slidable in it is the piston 53 which is acted upon by the spring 54 and is connected by its piston rod 55 to the lever 57.

The parts so far mentioned correspond to the parts having the same reference numerals in the constructional example given in the earlier specification referred to.

Further, 71 denotes the accelerator which in its inoperative position is pressed by the spring 72 against the stop 73 and carries on its end a lever extension 74, against which the rod 75 of the slide valve 21a, movable in the casing 76, bears under the pressure of the spring 22. The slide valve 21a has a portion 77 of reduced diameter.

78 is a flexible diaphragm which is connected to the control member 27a and is clamped between the cover 79 and the casing 5. The slide valve 27a has a portion 80 of reduced diameter and is slidable in the casing 81, which is provided with the two openings 82 and 83 for communication with the outer air, and to which in addition the conduits 3 and 46 are connected. 84 is a connecting conduit provided in the casing 81 and situated between the connection of the conduit 46 and the space 85 above the diaphragm 78. At 86 is shown a conduit branching off from the conduit 3.

91 is a casing adjoining the clutch cylinder 52 and having the piston 92 slidable in its upper portion. The conduit 46 is connected above the said piston 92. Between the piston 92 and the control member 40 is a rod 93 guided in the casing. The upper part of the control member 40 is made somewhat larger in diameter and has a bore hole 94 running lengthwise through it, to which is connected a transverse bore hole 95. Since the lower part of the change-over member 40 is smaller in diameter, an annular face 96 is formed at the transition point between the upper and lower parts. Mounted on the lower part of the change-over member 40 is a flange 97 bearing against which is a spring 98. The spring 98 presses against the control member 27b from above and the spring 99 from below. The control member 27b has a portion 100 of reduced diameter and also a longitudinal groove 101. At 102 is shown a connecting opening between the inner space of the clutch cylinder and the space below the control member 27b.

The stop member 21b is disposed laterally adjacent the control member 27b. It has upper and lower valves 103 and 104, pressing against which are the springs 105 and 106. The compressed air supply conduit 2 is connected to the space below the valve face 104. The space above the valve face 103 is in communication with the outer air via the opening 107. The upper part of the spring 105 bears against a small piston 108, above which the conduit 86 is connected to the casing 91. At 109 and 110 are shown the connecting passages between the control member 27b and the operative faces of the valves 103 and 104. At angle passage 111 branching off the passage 109 leads to the space 112 between the change-over member 40 and the control member 27b. The space provided below the control member 27b is denoted by 113. At 114 and 115 are bore holes providing communication with the outer air.

The device shown in the drawing operates as follows:

It will first of all be assumed that the vehicle is stationary. The lower disc 104 of the stop valve 21b is forced against its seat by the spring 106 and any compressed air which may be present below 104. Therefore, only the pressure of the outer air can reach the space to the right of the piston 53, the said pressure reaching the control member 27b through the opening 107 and the open upper valve 103 and passing through the control passages 100 and 101 of the said control member and through the opening 102 to the piston 53. Under the action of the springs 98 and 99, the slide valve 27b, in the said working condition, is in an upper position, in which it closes the communication with the passage 110, while fully or partly uncovering that with the passage 109. Under the action of the spring 54 which counteracts the clutch-engaging spring 17, the piston 53 is in its right-hand end position, and the clutch is disengaged.

If the driver now starts the engine, the latter at first runs at the lowest idling speed, the clutch still remaining disengaged as before, since the accelerator 71 is still in the inoperative position shown in the drawing. In this position, the lever extension 74 connected to the accelerator holds the control member 27a by means of the rod 75 against the action of the spring 22 in the lower position which is shown in the drawing and in which the mouth of the conduit 4 is closed by the upper part of the slide valve 27a, so that thereby no compressed air can as yet enter the conduits 3 and 86.

As soon as the driver displaces the accelerator from the inoperative position, the slide valve 27a moves towards its upper end position under the action of the spring 22 and uncovers the communication between the conduit 4 and the conduit 3 and hence also the conduit 86. Compressed air thereby enters the reduced portion 80 of the control member 27a. In the absence of compressed air, also at a low engine speed, the said control member is in a somewhat higher position than that shown in the drawing, in which its reduced portion 80 partly uncovers the mouths of the conduits 3 and 46, for example to about half. The compressed air supplied passes the reduced portion 80 and proceeds to the conduit 46 and through the branch passage 84 into the space 85 above the diaphragm 78. Due to the air pressure acting upon the latter, a downwardly acting counter-force is exerted on the slide valve 27b and simultaneously also on the centrifugal governor 7, whereby the slide valve 27a is returned into its central position shown in the drawing. In this central position, the entire auxiliary power device is in equilibrium, since in the event of any change in speed, upwardly or downwardly, the control valve 27a will be displaced from its central position by a slight amount, so that in the case of an increase in the speed, the said valve will uncover by a slight amount the mouth of the conduit 3, and in the case of a reduction in speed, the mouth of the opening 83, thereby producing a corresponding increase or reduction in pressure in the space 85, whereby a corresponding counter-force is at once again exerted on the control valve 27a, and the latter is again returned into its central position.

In this way, exactly as is effected by the control member 27 of the constructional example given in the earlier specification, a working medium pressure dependent upon the engine speed is produced, the said pressure being conveyed further through the conduit 46 and being employed for regulating the clutch-engaging force.

This regulated pressure passes through the conduit 46 to the casing 91 above the piston 92. Therefore, as soon as the driver has displaced the accelerator from the inoperative position, a pressure corresponding to the engine speed at that particular instant is exerted downwardly on the piston 92, and this pressure is transmitted by the rod 93 to the change-over member 40 and from the latter through the spring 98 to the control member 27b.

With the displacement of the accelerator 71 and the release of the supply of compressed air from the conduit 4, compressed air also passes under full pressure through the conduit 86 and enters above the piston 108. The latter compresses the spring 105, whereby the upper valve 103 of the control member 27b is forced on to its seat, while at the same time the lower valve 104 is moved away from its seat against the pressure of the spring 106. The communication of the passage 109 with the outer air is thereby closed, while at the same time the passage 110 is connected to the compressed air supply conduit.

At the speed which appears immediately after the control member 27a has been thrown over, the force exerted upwardly by the centrifugal governor upon the control member 27a has a certain magnitude, whereby in the central position of the control member 27a, a corresponding degree of air pressure appears above the diaphragm 78 in the manner described, which air pressure, together with the force of the spring 28 balances the centrifugal force. The degree of this air pressure corresponds to the clutch-engaging force which is necessary in order to cause the clutch members to be applied one against the other without transmitting power or with only a slight force of application.

The working medium pressure supplied from the control member 27a even when the engine speed rises by the slightest amount above the idling speed is on the other hand so great that, due to the pressure on the piston 92, the spring 98 is compressed to such an extent that the lower control edge of the reduced portion 100 of the control member 27b uncovers the mouth of the passage 110, so that compressed air passes from the passage 110 through the reduced portion 100 and the longitudinal passage 101 to the space 113. Due to the fact that the pressure of the air in the space 113 reacts against the lower end face of the slide valve 27b, the latter acts in the manner of an ordinary pressure-reducing valve, the reduced pressure varying according to the controlling force exerted through the spring 98. The control member 27a in combination with the diaphragm 78 also constitutes a similar pressure-reducing valve, the reduced pressure varying according to the controlling force exerted by the centrifugal governor 7. In the space 113 and hence, through the opening 102, also in the space of the cylinder 52 on the right of the piston 53 there appears a variable pressure which in its intensity is dependent upon the engine speed and which, at each variation of the engine speed upward or downward, varies at once automatically in accordance. During the clutch-engaging operation, the clutch will, according to the particular engine speed at the time, be applied by a clutch-engaging force which varies automatically in dependence upon the engine speed, due to the said regulation of the working medium pressure.

The space 112 above the control member 27b is in communication on the one hand with the passage 109 through the angle passage 111, and on the other hand with the outer air through the longitudinal passage 94 of the change-over member 40, the adjoining short transverse passage 95 and the opening 114, so that the pressure of the outer air prevails in the passage 109 and in the space 112. Even any pressure medium escaping through leakage at the upper control edge of the reduced portion 100 of the control member 27b cannot produce any increase in pressure, so long as the change-over member 40 is in a position between the upper position shown in the drawing and its lower position in which the annular face 86 bears against the lower end face of the guiding bore.

As soon, however, as the annular face 96 of the change-over member 40 bears against the lower end face of the guiding bore, the bore hole 114, hitherto providing communication with the outer air, is closed by the upper part of the change-over member 40. The space 112 and the passages 109 and 111 have now no longer any communication with the outer air. The pressure medium now escaping at the upper control edge of the reduced portion 100 of the control member 27b, due to leakage or suitable construction of the control edges, passes through the passage 111 into the space 112. Whereas previously the pressure of the outer air acted against the upper end face of the control member 27b, the regulated pressure supplied to the space 112 now acts on the said face, in consequence of the closure of the opening 114 by the changeover member 40 controlling the said opening. The control member 27b is thereby pressed further downwardly, so that the full air pressure is supplied from the passage 110 through the reduced portion 100 and the longitudinal passage 101 to the space 113 and through the bore hole 102 to the space on the right of the piston 53. Through leakage of the slide valve 27b, this pressure also enters the passage 109, the angle passage 111 and the space 112 above the slide valve 27b, so that the latter is permanently held in its lower position by the said pressure.

Up to the speed at which the foregoing operation occurs, the piston 92 and the change-over member 40 are continuously moved downwardly by the regulated pressure, and by the compression of the spring 98 a regulated pressure is produced and hence a clutch-engaging force regulated in accordance with the speed of the engine. At the engine speed at which the pressure supplied through the conduit 46 and acting upon the piston 92 is so great that the change-over member 40 reaches its lower end position, there occurs the aforesaid change-over from the regulated pressure to the maximum pressure of the working medium, and hence from the regulated clutch-engaging force to the maximum application force of the clutch.

The engagement of the clutch is therefore effected so that, after exceeding the idling speed, the movable clutch member travels suddenly over the air-gap of the clutch, in other words the clutch members are applied against each other without transmitting power or with only a slight force of application. The clutch-engaging force is then automatically increased in accordance with the engine speed and hence in accordance with resistances offered to the movement of the vehicle during the clutch-engaging operation, and also in accordance with the acceleration set by the driver by reason of the engine regulation. At a predetermined speed, which has been found to be the practical mean value, the full pressure of the working medium is finally released for the engagement of the clutch which is then applied with the maximum pressure of application.

The arrangement is preferably such that the maximum pressure of application of the clutch members is determined by the spring 17.

I claim:—

1. An automatic controlling device for a friction clutch, comprising power-operated means for varying the pressure between the clutch members, means for controlling said power-operated means to increase said pressure progressively as the speed of the driving clutch member rises from a low value, and means allowing the pressure to rise to its maximum independently of the speed of the driving member upon the attainment of a certain determined speed of the latter.

2. An automatic controlling device for a friction clutch, comprising power-operated means for effecting the engagement of the clutch members and for varying the pressure between them, means for controlling said power-operated means to bring the clutch members into contact with one another in dependence upon the initial movement of a member causing the speed of the driving clutch member to increase, means for controlling said power-operated means to increase the pressure between the clutch members progressively as the speed of the driving member rises, and means allowing the pressure to rise to its maximum independently of the speed of the driving member upon the attainment of a certain determined speed of the latter.

3. An automatic controlling device for a friction clutch, comprising a source of fluid pressure, fluid pressure responsive means for varying the pressure between the clutch members, a pressure-reducing valve between said source and said fluid pressure responsive means, and means for controlling said pressure-reducing valve in dependence upon the speed of the driving clutch member so that the reduced pressure rises progressively with the speed until a certain determined speed is attained and is then independent of the speed.

4. An automatic controlling device for a friction clutch, comprising a source of fluid pressure, fluid pressure responsive means for effecting the engagement of the clutch members and for varying the pressure between them, valve means between said source and said fluid pressure responsive means, the opening of said valve means being in dependence upon the initial movement of a member causing the speed of the driving clutch member to increase, a pressure-reducing valve between said valve means and said fluid pressure responsive means, and means for controlling said pressure-reducing valve in dependence upon the speed of the driving clutch member so that the reduced pressure rises progressively with the speed until a certain determined speed is attained and is then independent of the speed.

5. An automatic controlling device for a friction clutch having resilient means providing driving pressure between the driving and driven members, comprising a source of fluid pressure, fluid pressure responsive means opposing said resilient means, a pressure-reducing valve between said source and said fluid pressure responsive means, and means for controlling said pressure-reducing valve in dependence upon the speed of the driving clutch member so that the reduced pressure rises progressively with the speed until a certain determined speed is attained and is then independent of the speed.

6. An automatic controlling device for a friction clutch having resilient means providing driving pressure between the driving and driven members, comprising a source of fluid pressure, resilient means opposing and of greater strength than the resilient means of the clutch, fluid pressure responsive means opposing said resilient means of greater strength, a pressure-reducing valve between said source and said fluid pressure responsive means, and means for controlling said pressure-reducing valve in dependence upon the speed of the driving clutch member so that the reduced pressure rises progressively with the speed until a certain determined speed is attained and is then independent of the speed.

7. An automatic controlling device for a friction clutch, comprising a source of fluid pressure, fluid pressure responsive means for varying the pressure between the clutch members, a pressure-reducing valve between said source and said fluid pressure responsive means, a second pressure-reducing valve connected to said source, means responsive to the speed of the driving clutch member acting upon said second pressure-reducing valve so as to control the reduced pressure thereof, and means responsive to said reduced pressure acting upon said first-mentioned pressure-reducing valve so that until said reduced pressure rises to a certain determined value the reduced pressure acting upon the fluid pressure responsive means varies progressively with the speed of the driving clutch member, and when said determined value is attained said first-mentioned pressure-reducing valve is rendered independent of the reaction of the pressure acting upon the fluid pressure responsive means.

8. An automatic controlling device for a friction clutch, comprising a source of fluid pressure, a pressure-reducing valve connected to said source, means responsive to the speed of the driving clutch member acting upon said valve so as to control the reduced pressure thereof, a movable member subjected to the action of said reduced pressure, a resilient member opposing the movement of said member, and a second pressure-reducing valve acted upon by said resilient element and by atmospheric pressure through a passage controlled by said movable member and arranged between the source and pressure responsive means for varying the pressure between the clutch members.

9. An automatic controlling device for a friction clutch, comprising a source of fluid pressure, valve means connected to said source, the opening of said valve means being in dependence upon the initial movement of a member causing the speed of the driving clutch member to increase, a pressure reducing valve connected to said valve means, means responsive to the speed of the driving clutch member acting upon said pressure-reducing valve so as to control the reduced pressure thereof, a movable member subjected to the action of said reduced pressure, a resilient member opposing the movement of said member, a second pressure-reducing valve connected to the source of fluid pressure and acted upon by said resilient element and by atmospheric pressure through a passage controlled by said movable member and a passage controlled by valve means the closing of which is in dependence upon the initial movement of the member causing the speed of the clutch member to increase, pressure responsive means connected to said second pressure-reducing valve for varying the pressure between the clutch members, and valve means between the source and said second pressure-reducing valve, the opening of said valve means being in dependence upon the initial movement of the member causing the speed of the driving clutch member to increase.

10. An automatic controlling device for a friction clutch having driving and driven members and resilient means providing driving pressure between said members, comprising means for exerting pressure opposing said resilient means, power operated means for controlling said opposing means to decrease the opposing pressure as a function only of the speed of the driving member as said speed rises from a low value, and to overcome the opposing pressure upon the attainment of a certain determined speed of the driving clutch member, and means for maintaining such conditions even on going again below said speed.

11. An automatic clutch-controlling device for a motor vehicle having a friction clutch the driving and driven members of which are held in driving engagement by resilient means, comprising means for exerting pressure opposing said resilient means, power operated means for controlling said opposing means to bring the clutch members into contact with one another in dependence upon the initial movement of the power regulating device of the engine, for controlling said opposing means to decrease the opposing pressure as a function only of the speed of the engine as said speed rises, and to overcome the opposing pressure upon the attainment of a certain determined engine speed, and means for maintaining such conditions even on going again below said speed.

12. An automatic controlling device for a friction clutch, comprising power-operated means for varying the pressure between the clutch members, means for controlling said power-operated means to increase said pressure as a function only of the speed of the driving clutch member as said speed rises from a low value, and to maintain a maximum pressure between the clutch members after attaining a predetermined speed, both on exceeding and also on going below said speed.

13. An automatic controlling device for a friction clutch, comprising power-operated means for effecting the engagement of the clutch members and for varying the pressure between them, means for controlling said power-operated means to bring the clutch members into contact with one another in dependence upon the initial movement of a member causing the speed of the driving clutch member to increase, means for controlling said power-operated means to increase the pressure between the clutch members as a function only of the speed of the driving member as said speed rises, and means allowing the pressure to keep on a maximum independently of the speed of the driving member upon the attainment of a certain determined speed of the latter.

KARL MAYBACH.